US011219268B2

(12) United States Patent
Simonetti

(10) Patent No.: US 11,219,268 B2
(45) Date of Patent: Jan. 11, 2022

(54) GLIDING SPORT BOOT SOLE

(71) Applicant: ROSSIGNOL LANGE S.R.L., Treviso (IT)

(72) Inventor: Luigi Simonetti, Cavareno (IT)

(73) Assignee: ROSSIGNOL LANGE S.R.L., Montebelluna Treviso (IT)

( * ) Notice: Subject to any disclaimer, the term of this patent is extended or adjusted under 35 U.S.C. 154(b) by 765 days.

(21) Appl. No.: 15/221,039

(22) Filed: Jul. 27, 2016

(65) Prior Publication Data
US 2017/0027274 A1 Feb. 2, 2017

(30) Foreign Application Priority Data
Jul. 28, 2015 (EP) .................................. 15425055

(51) Int. Cl.
A43B 13/18 (2006.01)
A43B 3/00 (2006.01)
A43B 13/22 (2006.01)
A43B 5/04 (2006.01)
B29D 35/14 (2010.01)
A43C 15/16 (2006.01)
B29D 35/00 (2010.01)
B29D 35/12 (2010.01)
B29K 75/00 (2006.01)
B29K 675/00 (2006.01)

(52) U.S. Cl.
CPC .......... A43B 5/0413 (2013.01); A43B 3/0073 (2013.01); A43B 5/0411 (2013.01); A43B 13/181 (2013.01); A43B 13/184 (2013.01); A43B 13/223 (2013.01); A43C 15/161 (2013.01); B29D 35/0009 (2013.01); B29D 35/122 (2013.01); B29D 35/142 (2013.01); B29K 2075/00 (2013.01); B29K 2675/00 (2013.01)

(58) Field of Classification Search
CPC ... A43B 5/0413; A43B 3/0073; A43B 5/0411; A43B 13/181
USPC ......................................................... 36/117.2
See application file for complete search history.

(56) References Cited

U.S. PATENT DOCUMENTS

| 5,664,797 A * | 9/1997 | Haughlin ............. A43B 5/0411 280/615 |
| 2002/0092207 A1* | 7/2002 | Girard .................. A43B 5/0411 36/117.3 |
| 2010/0269374 A1 | 10/2010 | Hsieh |

(Continued)

FOREIGN PATENT DOCUMENTS

| EP | 1 210 883 A1 | 6/2002 |
| EP | 2 465 371 A1 | 6/2012 |

(Continued)

OTHER PUBLICATIONS

European Search Report and Written Opinion dated Dec. 3, 2015 issued in counterpart application No. EP15425055; w/ English machine translation (23 pages).

Primary Examiner — Alissa L Hoey
Assistant Examiner — Catherine M Ferreira
(74) Attorney, Agent, or Firm — Westerman, Hattori, Daniels & Adrian, LLP

(57) ABSTRACT

Ski boot sole (10), characterized in that it comprises:
  a plate (11) made of a composite material comprising reinforcing ribs (20);
  rear (30) and front (40) components extending under the plate (11) and forming gripping tread patterns (35, 45).

16 Claims, 4 Drawing Sheets

(56) References Cited

U.S. PATENT DOCUMENTS

2012/0151801 A1* 6/2012 Miette .................. A43B 5/0413
                                                      36/117.1
2013/0139412 A1* 6/2013 Auger .................. A43B 1/0009
                                                      36/25 R
2014/0026441 A1* 1/2014 Stauffer ................ A43C 15/00
                                                      36/103

FOREIGN PATENT DOCUMENTS

EP      2 737 815 A2   6/2014
FR      2 887 178 A1   12/2006

* cited by examiner

GLIDING SPORT BOOT SOLE

The invention relates to a gliding sport boot sole, notably a ski boot sole, particularly a cross-country ski boot or alpine touring ski boot sole and to a sport boot as such incorporating such a sole. It also relates to a method of manufacturing such a sole and such a sports boot.

A cross-country skiboot sole requires on the one hand great stiffness and strength, in order to support reliably binding to the cross-country ski and to contribute to correct transmission of effort during the cross-country skiing, and requires on the other hand a satisfactory level of comfort, notably for the phases outside of the actual skiing, such as walking, all at minimum weight. Faced with these contradictory requirements, the existing solutions remain unsatisfactory.

A first object of the present invention is therefore to propose a sports boot sole which makes it possible to achieve sufficient stiffness for use in performing sport, notably cross-country skiing.

A second object of the present invention is to propose a sports boot sole offering minimum weight.

A third object of the present invention is to propose a sports boot sole that makes it possible to achieve a satisfactory level of comfort.

A fourth object of the present invention is to propose a sports boot sole that can be manufactured at reasonable cost.

According to the concept of the invention, the sports boot sole comprises:

- a plate made of a composite material comprising reinforcing ribs;
- rear and front components extending under the plate and forming gripping tread patterns such as studs or lugs.

The ribs may adopt advantageous forms described below. The plate made of composite material advantageously extends over a length of at least 60% inclusive of the length of the sole.

The invention is more specifically defined by the claims.

These objects, features and advantages of the present invention will be explained in detail in the following description of one particular embodiment illustrated non-limitingly as being a cross-country ski boot with reference to the attached figures among which:

In the following description, the vertical direction refers to the direction from the bottom upwards, namely from the sole of the boot towards the top of the boot. The longitudinal direction refers to the direction perpendicular to the vertical direction, oriented from the rear of the boot (and of the sole) towards the front thereof. The transverse direction is the direction perpendicular to the longitudinal direction in the plane of the sole.

The invention will be illustrated for the particular case of cross-country skiing. More generally, it is particularly well suited to a ski boot used in cross-country skiing or in touring skiing for example.

Figure 1:
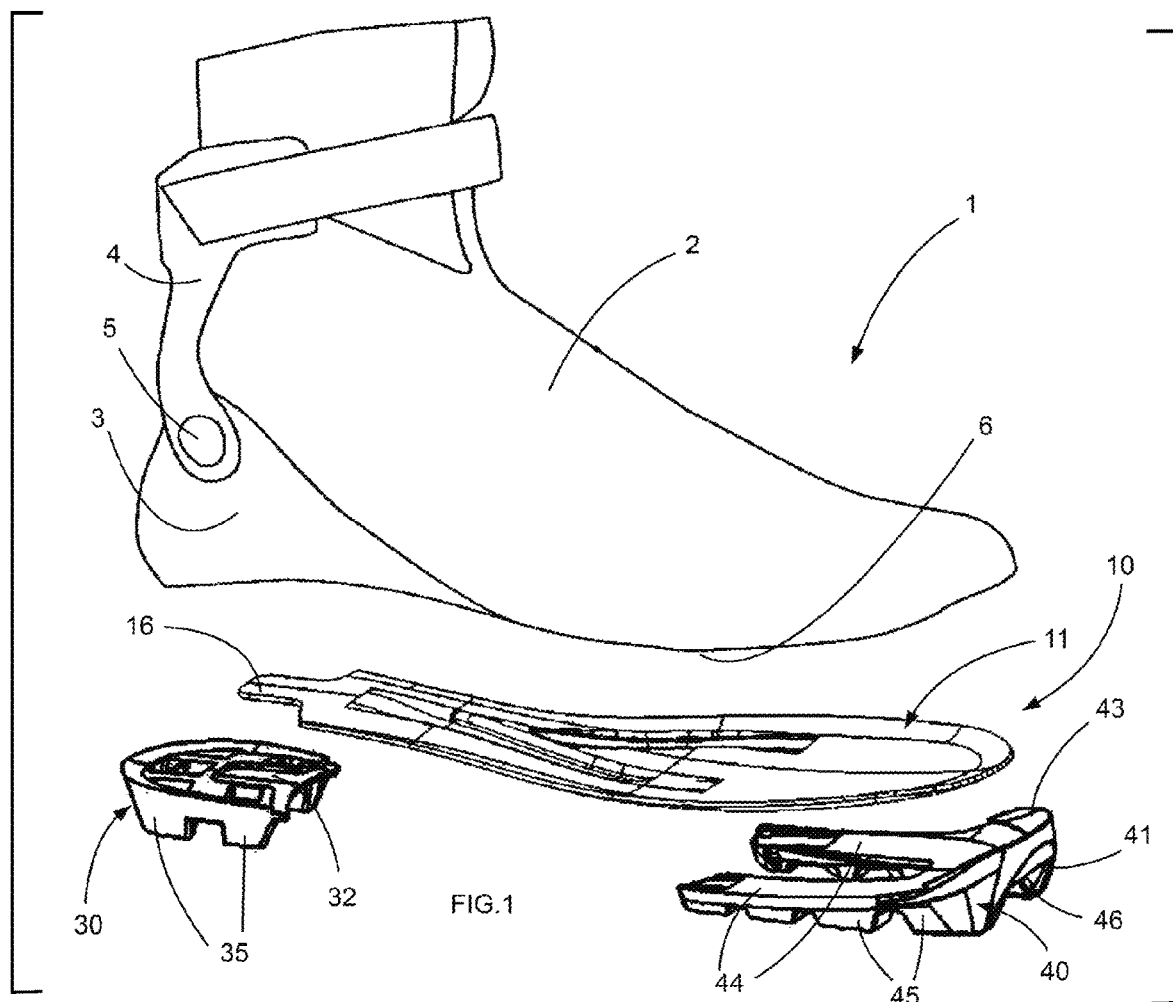
FIG. 1 depicts an exploded view of a cross-country ski boot comprising a sole according to one embodiment of the invention.

FIG. 1 illustrates a cross-country ski boot 1, which comprises an upper 2 and a sole 10, a method of manufacture of which will be described hereinbelow. This boot is particularly well suited to the practice referred to as "skating". For that, the sole comprises at least one trasverse binding bar in its anterior part, which bar is intended to collaborate with a binding device belonging to a cross-country ski so as to secure the boot to a cross-country ski. The upper 2 is formed of a soft part made of one or more layers of a textile material and/or of plastic. This upper may be stiffened by a rear stiffener 3 and possibly a cuff 4 articulated to the rear stiffener 3 at the ankle pivot 5. This upper 2 is secured to the upper surface of the sole 10 and may possibly overhang the sole in the rear part.

According to the embodiment of the invention, the method of manufacturing the sole 10 comprises a first step involving manufacturing a flat plate made of composite material. This flat plate is cut out to the predefined shape for the desired shoe size so as to obtain the composite plate intended to form at least part of the sole 10.

Moreover, in the embodiment illustrated, the composite flat plate is shortened at its rear part, where a tab 16 is formed. The composite plate could, however, cover the entirety of the sole from the front end to the rear end thereof.

The composite material used for the flat plate comprises a matrix, for example a thermoplastic matrix such as a thermoplastic polyurethane (TPU) matrix, and a reinforcer, for example comprising glass and/or carbon fibre. These reinforcing fibres preferably extend over the entire surface of the flat plate, continuously, making it possible to use fibres of great length. Advantageously, the flat plate thus incorporates reinforcing fibres of lengths greater than or equal to 100 mm. Naturally, other materials are conceivable, such as, for example, aramid fibres or natural fibres which can be used alone or in combination with other fibres. The flat plate may be produced as a single layer or, as an alternative, may be obtained by the superposition of several layers, it being possible for these various layers to have the same thickness or not, and be made of materials that may or may not be identical. For preference, the flat plate has a total thickness of around 1.5 mm, advantageously comprised between 1.2 and 1.8 mm.

The flat plate according to the embodiment of the invention is made up of six layers containing carbon and/or glass fibre, each 0.25 mm thick. The two outermost layers are made of carbon fibre and TPU resin, and the four layers on the inside are made up of glass fibre and TPU resin. The stacking of the various layers of which the flat plate 11 is made is symmetric. As an alternative, only layers containing glass fibre may be superposed.

The fibres used may have the same orientation in each superposed layer of the composite plate. In addition, each layer may comprise a combination of crossed fibres, perpendicular to one another. Notably it may contain longitudinal fibres and transverse fibres.

Figure 2:
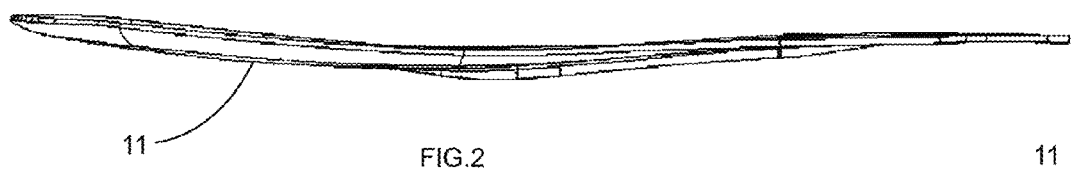
FIG. 2 depicts a side view of a plate of the sole according to the embodiment of the invention.
Figure 3:
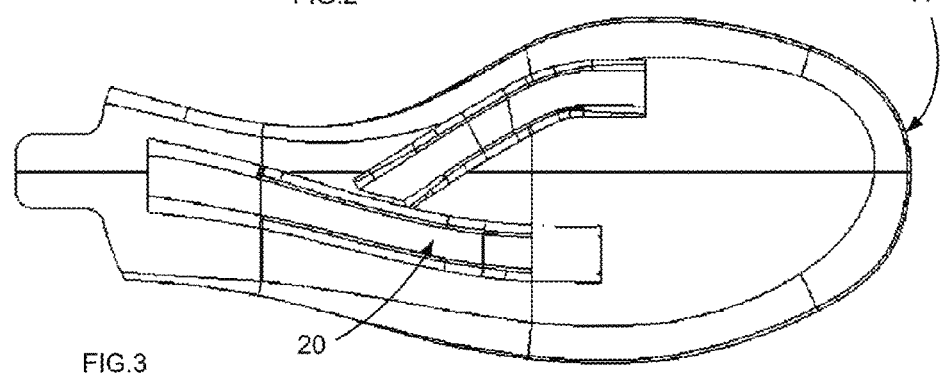
FIG. 3 depicts an upper view of the plate of the sole according to the embodiment of the invention.
Figure 4:
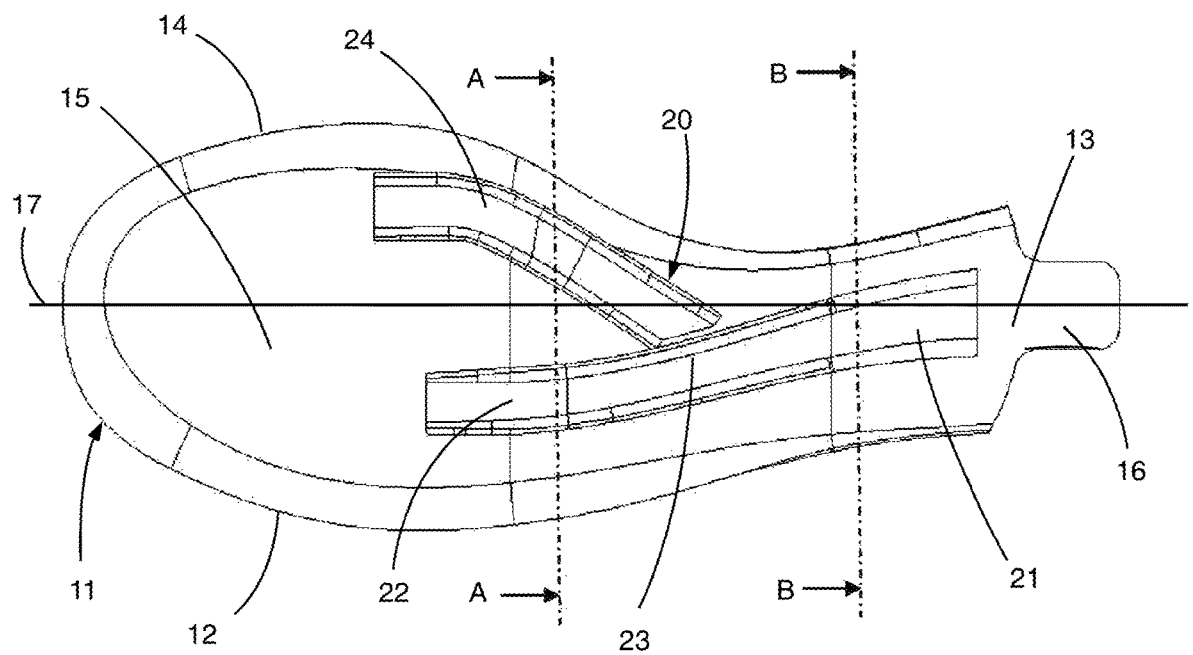
FIG. 4 depicts a bottom view of the plate of the sole according to the embodiment of the invention.
Figure 5:
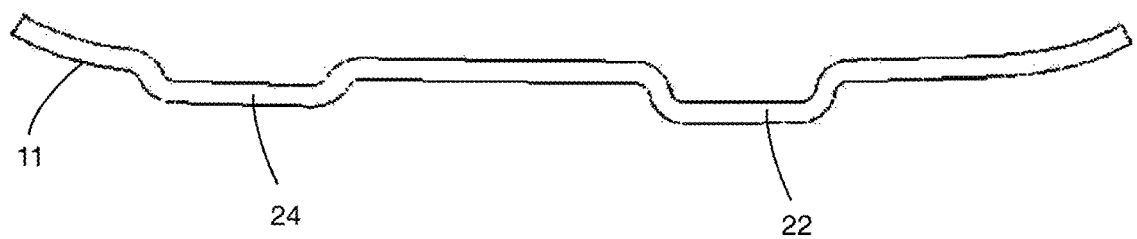
FIG. 5 depicts a front view in section A-A of the plate of the sole according to the embodiment of the invention.
Figure 6:
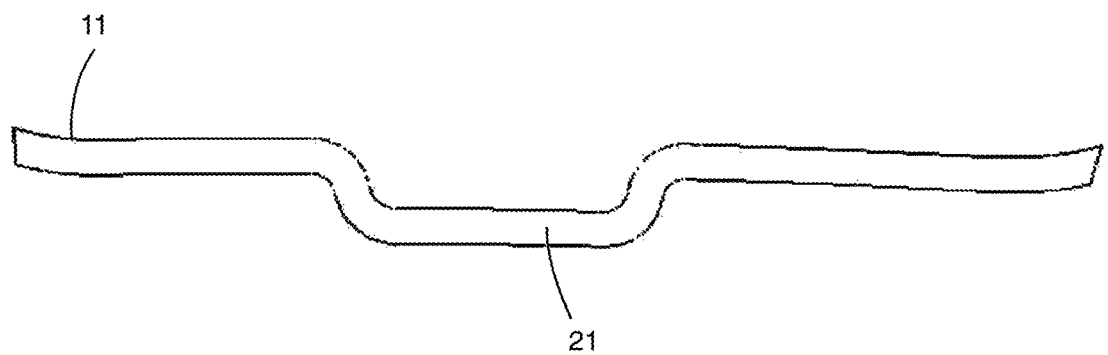
FIG. 6 depicts a front view in section B-B of the plate of the sole according to the embodiment of the invention.

The method of manufacture next comprises a second step in which the flat plate of composite material is positioned in a mould which gives it a curved shape particularly visible in FIG. 2, suited to the anatomy of the foot, and forms reinforcing ribs 20 the relief of which faces toward the underside. This results in a plate 11. This second step is obtained by thermoforming the flat plate, something that can be done because it incorporates a thermoplastic matrix. The reinforcing ribs 20 make it possible to achieve optimal stiffness, both torsionally and flexurally, of the plate 11 and therefore of the sole, something that cannot be achieved with a non-ribbed composite plate. The ribs have a height less than or equal to 5 mm and preferably comprised between 2 and 4 mm inclusive. In addition, they have a width less than or equal to 20 mm, preferably comprised between 5 and 15 mm inclusive. The curvature is slight, between 1 and 2 mm inclusive on the sides of the plate, which therefore remains substantially flat. These shapes and dimensions are particularly illustrated by FIGS. 3 to 5.

According to the embodiment, the reinforcing ribs 20 are Y-shaped, formed by a first rear rib 21 extending in the central part of the plate, namely substantially along the longitudinal axis 17 of the plate 11, and towards the rear of the finished sole, as will be illustrated hereinafter, chiefly in the region of the arch of the foot, substantially in the longitudinal direction close to the central longitudinal axis 27 of the sole. Each rear rib 21 is extended forwards by an outer rib 22, substantially parallel to the outer edge 12 of the plate 11, heading for a position on the outside of the foot of a user, namely on the side of the external malleolus thereof. At the intersection 23 of the two first ribs 21, 22, an inner second rib 24 extends forwards, on the inside of the plate 11, heading for a position on the inside of the foot of a user, namely on the side of his medial malleolus. This second rib 24 is curved, substantially parallel to the inside edge 14 of the plate 11. The point of intersection 23 of the ribs is positioned substantially at the level of the central part of the sole 10. The two ribs 21, 22 are in continuity with one another and substantially the same length. The inner second rib 24 extends slightly further forward towards the front of the plate 11 than the outer rib 22. According to the embodiment of the invention, this inner second rib 24 does not entirely join up with the ribs 21 and 22, has a height that decreases progressively until it substantially disappears at the level of the point of intersection 23 mentioned hereinabove.

The ribs, which extend longitudinally at least in part in the central or near-central zones of the sole, thus perform a first function of stiffening the central zone of the sole, notably in terms of the flexural rigidity of the sole. This function is notably particularly performed by the rear rib 21. It thus stabilizes the sole in the rear part thereof. Furthermore, the Y shape of the ribs allows the two front ribs 22, 24 to perform a torsional stiffening function for the sole.

According to the embodiment, the stiffening ribs 20 occupy substantially half the length of the plate 11. The part of the plate 11 without rib 20 is divided into a rear part 13, representing approximately one quarter of the length of the plate 11, and a front part 15, representing approximately one quarter of the length of the plate 11. The overall length of this rib-free part, connecting the two, rear 13 and front 15, parts, represents substantially half the length of the plate 11. The stiffening ribs 20 occupy a central zone of the plate 11, over a length advantageously comprised between 25% and 75% of the total length of the plate, and preferably 50%. As an alternative, the stiffening ribs 20 may extend into the front part 15 of the plate or may even extend over the entire length thereof.

Naturally, the invention is not restricted to the ribs of the embodiment described. These ribs may exhibit other shapes and/or sizes. As an alternative, the stiffening ribs 20 may extend into the front part 15 of the plate 11 or may even extend over the entire length of the plate 11.

Figure 7:
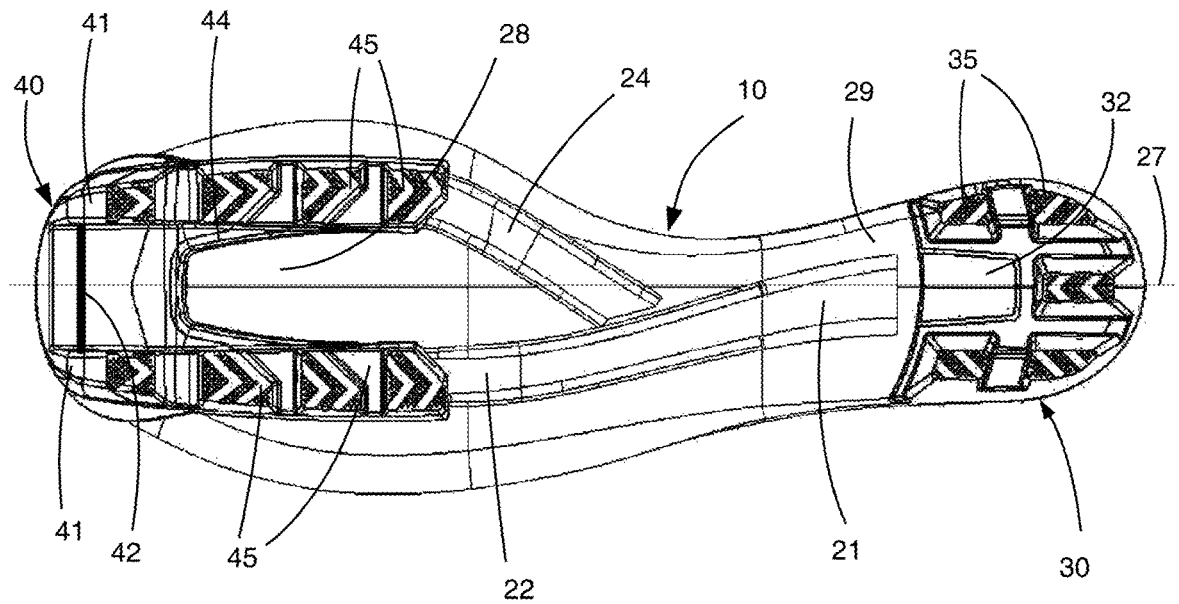
FIG. 7 depicts a bottom view of the sole according to the embodiment of the invention.
Figure 8:
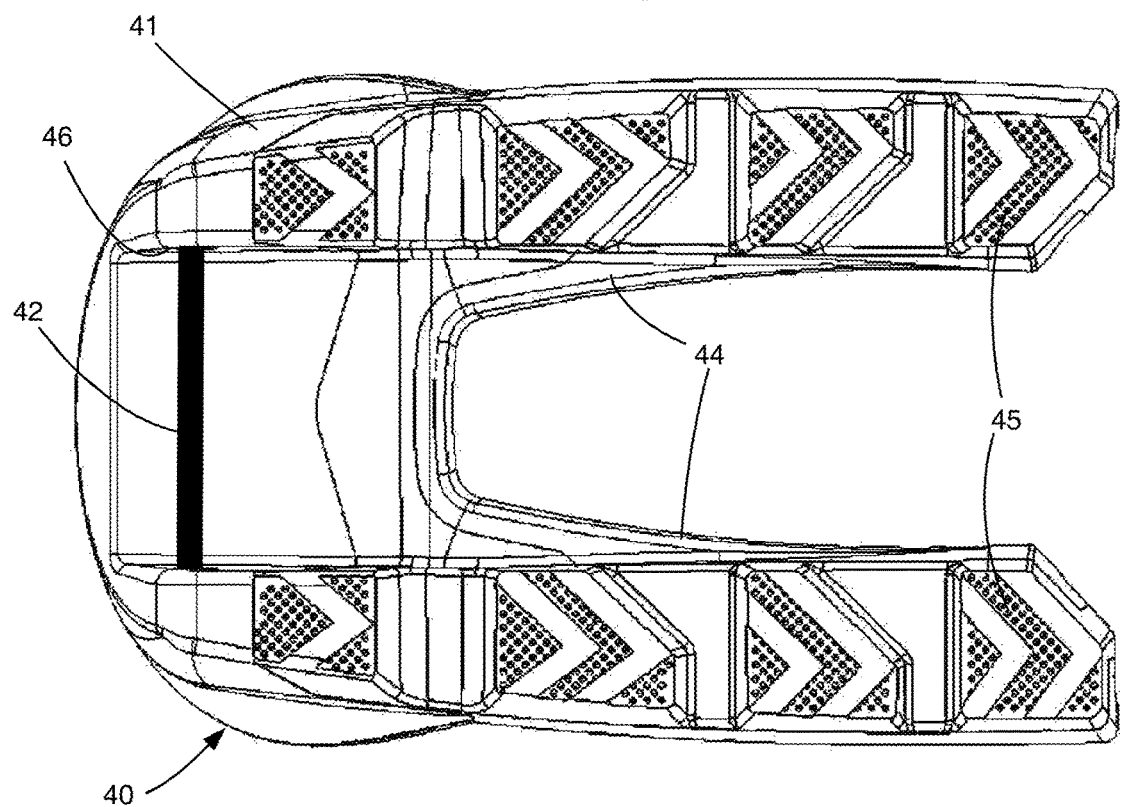
FIG. 8 depicts a bottom view of a front component of the sole according to the embodiment of the invention.

In particular, the front ribs 22, 24 may be extended into the front part 15 of the plate 11 to extend over a length of 25 to 80% of the front zone 28 of the sole 10, as is particularly visible in FIG. 7. They may extend over more than half of the front zone 28 of the sole.

In addition, the rear rib 21 may be extended into the rear part 13 of the plate 11 to extend over a length representing between 30 and 60% of the rear zone 29 of the sole 10. The rear rib 21 is in a substantially central position on the sole. In other words, the rear rib 21 may be oriented by an angle comprised between 0 and 45 degrees with respect to the longitudinal axis 17 of the plate 11. The rear rib 21 may also be offset by plus or minus 5 mm with respect to the longitudinal axis. In addition, the rear rib may extend over a length representing between 30 and 60% of the rear zone of the sole 10.

Note that the length of the sole 10 is measured from the foremost part of the front component 40 to the rearmost part of the rear component 30 after final assembly of the sole 10 which will be described later on.

In addition, the ribs depicted are Y-shaped. As an alternative, it is possible for them not to extend over this entire shape, it therefore being possible for the continuity of the Y shape to be interrupted. In particular, it is possible for one or more ribs not to extend as far as the central point of intersection 23, in which case the ribs will not necessarily all meet.

Figure 9:
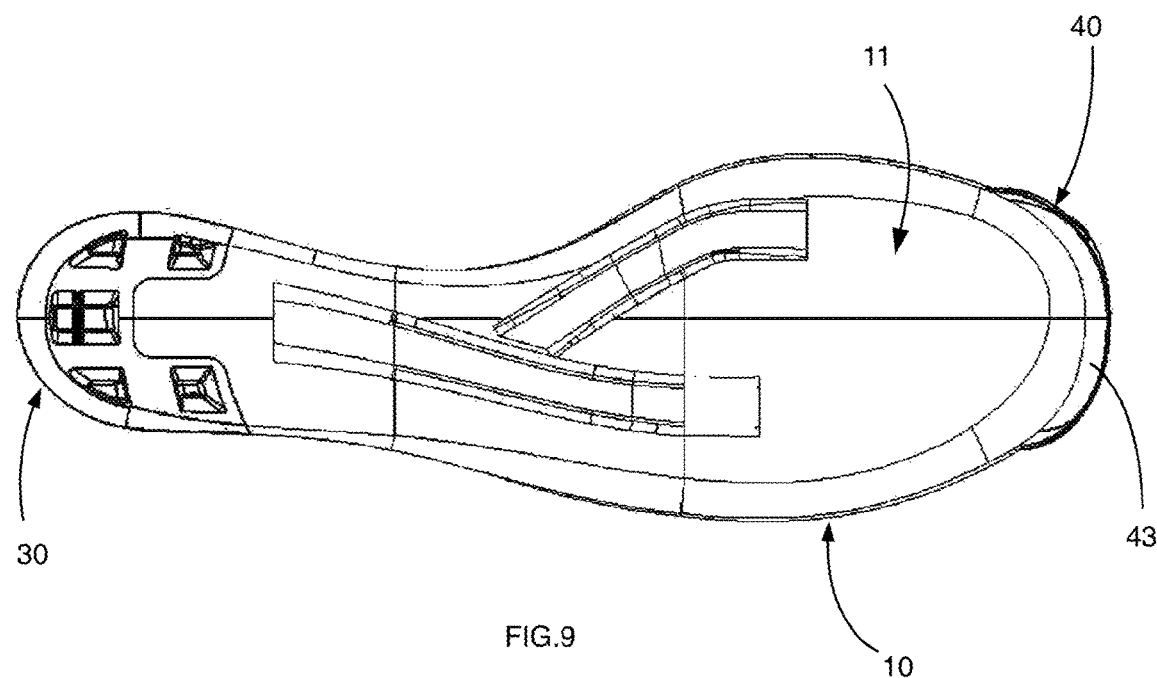
FIG. 9 depicts an upper view of the sole according to the embodiment of the invention.
Figure 10:
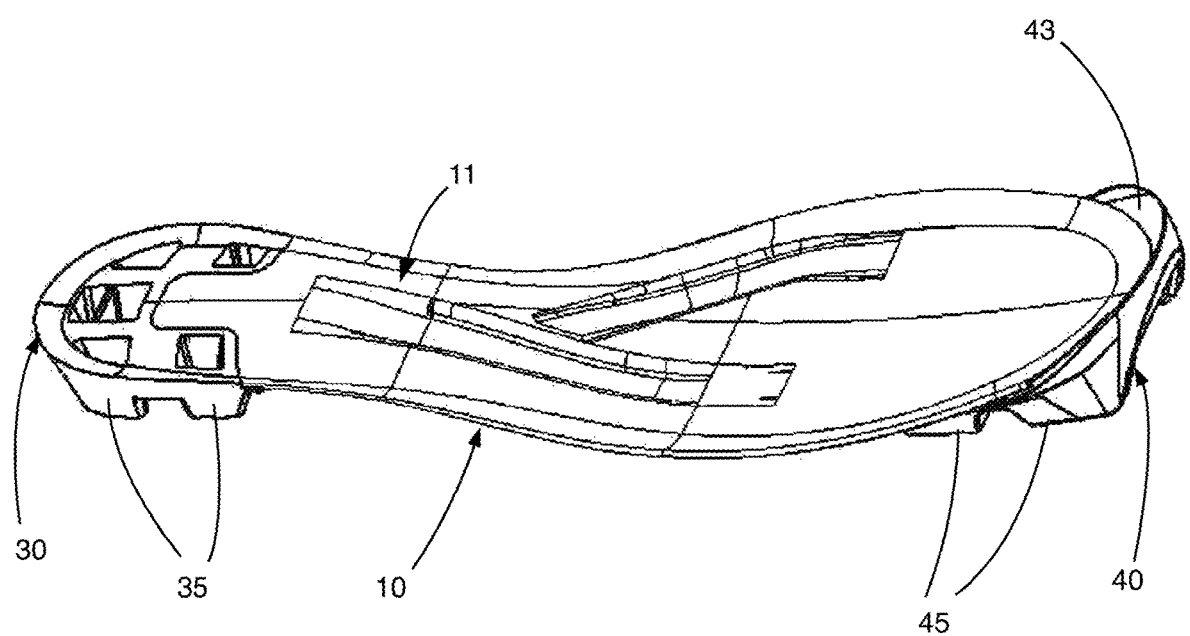
FIG. 10 depicts a perspective view from above of the sole according to the embodiment of the invention.

FIGS. 9 and 10 show the sole 10 and the plate 11 in upper view. The stiffening ribs 20 look hollow here, which means to say take the form of grooves in this view from the opposite side.

The plate 11 thus formed by the first two steps in the method represents the essential element in the sports boot sole. Its upper surface has a curvature in the longitudinal direction, visible in FIG. 2, and is substantially flat transversely, with the exception of the slight curvature forming a periphery of very small, raised, height, and the grooves. In another alternative form, this plate 11 could be substantially planar in the longitudinal direction. It is intended to be secured to the underside 6 of the upper 2 of a sports boot, by any means, mechanical or otherwise, advantageously by gluing.

FIGS. 7, 9 and 10 depict the finished sole 10. For that, the method of manufacture comprises a third step involving manufacturing a rear component 30 and a front component 40 then a fourth step of assembling these components 30, 40 with the plate 11. The finalized sole 10 thus has a longitudinal central axis 27 substantially aligned with the longitudinal axis 17 of the plate 11. These two components once assembled have the prime function of forming a sole underside suited to walking. They have the secondary function of forming a binding element suited to collaborating with a complementary binding device arranged on a gliding board, a cross-country ski according to the example illustrated, or any other ski more generally.

Thus, the rear component 30 is formed of studs 35 made of plastics material, making it possible to perform a cushioning and non-skid function, for example when walking. The rear component 30 comprises a substantially flat and rectangular central housing 32 to accept a tab 16 arranged at the rear part of the plate, to facilitate collaboration and assembly between the two elements 11, 30. The rear component 30 may be made of plastic, for example polyurethane with a hardness of between 40 and 50 ShD or any other plastics material of equivalent hardness.

In an alternative form that has not been depicted, the plate 11 may completely cover the upper surface of the rear component 30. However, the embodiment illustrated with the plate 11 shortened at the rear allows the boot to provide more cushioning and less stiffness in the heel, thus promoting user comfort.

The front component 40 comprises at the front part two downwardly extending lateral extensions 41, these lateral extensions each comprising an opening 46 to accept at least one binding bar 42 which is intended to collaborate with a binding device belonging to a cross-country ski, according to a usual binding standard. These two lateral extensions 41 are joined together transversely by a plastic connector. Thus, the front component 40 is shaped as a U or as a horseshoe, with a rounded part situated towards the front end of the sole, from which two lateral portions 44 extend in a substantially longitudinal direction in the rear part of the front component 40. The lateral extensions 41 and lateral portions 44 comprise studs 45. At the top at the front, this front component 40 has a slight rim 43 delimiting a housing and an end stop to accommodate the front part of the plate 11 and of the upper 2. Next, the rest of this front component 40 extends under the plate 11. In particular, the two lateral portions 44 extend towards the rear until they come into the extension of the two ribs, these respectively being the inner rib 24 and the outer rib 22 described earlier. These two lateral extensions 44 form a base for accepting studs 45. Advantageously, the front component 40 is made up of two different materials. A first part is manufactured from a first rigid plastic, for example polyurethane with a hardness of between 48 and 55 ShD, or any other plastics material of equivalent hardness, at least in the zone supporting the binding bar 42, namely at the level of the lateral extensions 41, and possibly extending between the studs and the plate 11 at the level of the lateral portions 44. A second part is advantageously manufactured from a second, less rigid, plastics material favourable for walking, for example from a polyurethane with a hardness comprised between 40 and 50 ShD, or any other plastics material of equivalent hardness. Advantageously, the studs 45 forming the lower part of the front component 40 are made from the same material as the studs 35 of the rear component 30. Preferably, this front component 40 is manufactured by injection moulding of plastic, the second softer plastic material being overinjected on the more rigid first material. Of course, these first and second parts could be made from one single material. The two lateral portions 44 are in the continuation of the two, outer 22 and inner 24, ribs. In another alternative form, the two lateral portions 44 could be superposed with these ribs.

According to the embodiment, the two lateral portions 44 extend as far as a zone corresponding to the rearmost metatarsals. This zone corresponds to the zone comprised approximately 5 to 15 mm rearward, in the longitudinal direction, from the zone of greatest width (measured in the transverse direction) of the sole. The studs 45 occupy almost all of the length of the extensions. Advantageously, they stop at the zone of greatest width of the sole, or alternatively at most 15 mm to the rear of this zone of greatest width. This structure of the front component makes it possible to minimize the plastic zone of the sole, since there is practically no plastic in the central part of the sole, with the exception of a connection at the front part of the sole as explained hereinabove.

The two components 30, 40 described hereinabove are preferably made of a plastics material using an injection-moulding process, in the third step of the method, before being assembled by any mechanical or other means with the plate 11, advantageously using gluing. As an alternative, these two components may be manufactured from another material, significantly softer than the composite material of the plate 11. According to one particularly advantageous alternative form of embodiment, these two components 30, 40, or even just one of them, are manufactured directly by plastic overinjection onto the plate 11, which ensures optimal fixation of these different elements of the sole. For that, the injected plastic of the two components is compatible with the material used for the matrix of the composite material of the plate 11: for example, they are both made from a material containing polyurethane. In this advantageous alternative form of embodiment, the two steps three and four mentioned hereinabove are therefore merged into a single step.

The sole is thus finalized by assembling the components 30, 40 with the plate 11 made of composite material. However, the plate represents the essential component of the sole, and extends over a length representing at least 60% inclusive, preferably at least 75% inclusive of the length of the sole. It may extend over the entire length of the sole, with the possible exception of a zone having studs. The lateral edges 12, 14 of the plate 11 form a significant part of the edges of the sole. The plate in fact advantageously extends over the entire width of the sole, which means to say as far as the lateral edges that connect to the upper, or, as an alternative, over at least 60% of this width of sole. Note that the sole maintains an upper surface that is substantially flat, intended to accept the upper 2 of the boot. It has no, or very little, rim around its periphery (no lateral wall). The two components—the front component 40 and the rear component 30—may exhibit other shapes and structures. Notably as an alternative, the front component 40 could be formed of more than two materials, or of one single material, and the rear component 30 may be formed of two materials or more.

The invention also relates to the sole 10 as such, which comprises a plate 11 made of composite material extending over at least 75% of the length of the sole and comprising reinforcing ribs 20, and which comprises rear 30 and front 40 components extending under the plate 11 and forming studs 35, 45.

The approach chosen is particularly advantageous for manufacturing a series of soles of different shoe-sizes. Specifically, identical rear 30 and/or front 40 components may be assembled with plates 11 of different sizes, corresponding to different shoe sizes. This approach makes it possible to minimize the number of injection moulds needed to manufacture these components 30, 40, thereby minimizing production costs. By way of example, in order to manufacture nine sole sizes (for nine shoe-sizes), it is possible to restrict the manufacture of the front 40 and rear 30 components to just three sizes, namely to be limited to three moulds for each component. Using this approach, one and the same front 40 and rear 30 components will be used for three plates 11 of different sizes.

Moreover, in an advantageous embodiment, the rear stiffener 3 and the cuff 4 may be cut from the same flat sheet of composite material used to obtain the plate 11 of the sole. This plate is then cut to the desired form for the rear of the foot and shaped by moulding to be used as a reinforcement on the upper 2. Thus, the same sheet of composite material can be used for various components that make up the boot, thereby minimizing production costs and raw-material supplies.

The rear stiffener 3 advantageously envelops the heel. For that, it rises up in particular on the lateral sides of the upper in the region of the malleolus zone. The stiffener also has rims, forming lower flaps, which more or less partially cover the underside 6 of the upper, to which the sole is secured. Thus, the parts of the lower flap form part of the sole. In that case, there is advantageously a longitudinal slot between the two lateral rims of the stiffener. The plate 11 of the sole is then secured to this assembly comprising upper 2 and lower flaps of the rear stiffener 3, for example using gluing, and in particular covers the slot in the stiffener.

In the previous embodiment with a rear stiffener that has lower flaps, the plate 11 of the sole narrows progressively from the front towards the rear to reach a minimum width (before the heel) comprised between 35 mm and 55 mm, preferably between 40 mm and 50 mm. It then widens to form the rear part of the plate. In the zone of greatest width of the plate, which is situated in the zone of the metatarsals, the maximum width is more or less doubled in comparison with the minimum width. In the rear part, the sole does not cover the entire underside of the upper. Specifically, the lower flaps of the rear stiffener allow the surface of the sole to be extended laterally, forming the underside of the upper. These lower flaps thus make it possible to complete the composite plate of the sole 10. As an alternative, the lower flaps may replace part of the composite plate of the sole 10, notably facing the rear part of the upper.

Finally, the solution according to the invention therefore offers the following advantages:
- the plate 11 made of composite material makes it possible to form a sole that is very stiff having preferential zones that are stiffer still, through the addition of ribs;
- it makes it possible to form a sole that is stiff and lightweight, particularly effective, and notably suited to competition;
- because of this stiffness, the quantity of plastics material used is minimized, or even eliminated in the central part of the sole;
- it can be implemented easily, allowing high speed and low cost manufacture of a sports boot sole, particularly minimizing the number of injection moulds used.

The invention claimed is:

1. Ski boot sole comprising: a ski boot sole plate made of a composite material comprising reinforcing ribs of the plate, the reinforcing ribs of the plate forming reinforcing ribs of the ski boot sole, wherein the reinforcing ribs of the ski boot sole consist essentially of the reinforcing ribs of the plate and are integrally formed in the composite material of the plate; and rear and front ski boot sole components extending under the plate and forming gripping tread patterns, the front component comprising at least one binding device intended to cooperate with a corresponding binding device belonging to a ski, wherein the rear and front components are assembled to the plate at a distance from each other, so that the composite material of the plate forms a central part of an underside of the sole, wherein the central part of the underside of the sole extends between the rear and front components, wherein the underside of the sole consists essentially of the composite material of the plate between the front and the rear components, wherein the reinforcing ribs include two front ribs extending on lateral parts of the plate on an anterior part of the sole and a rear rib extending in a central zone of the sole forming a Y shape, the two front ribs each extending over a length in a range of from 30% to 80% of a length of a front half of the sole, wherein the length of the front half of the sole is a distance between a middle of the sole and a front end thereof, wherein the ribs have a height of less than or equal to 5 mm and a width of between 5 mm and 20 mm, and wherein the reinforcing ribs are formed by folds of the plate, the reinforcing ribs having a height greater than a thickness of the plate with projecting surfaces of the reinforcing ribs projecting convexly outward from a first face of the plate and with concave relief surfaces extending concavely inward from a second face of the plate.

2. Ski boot sole according to claim 1, wherein the two front ribs of the plate include an outer rib and an inner rib, the outer rib and inner rib being arranged at lateral parts of the plate in an anterior half of the sole inset from medial and lateral side edges of the sole and with the outer rib extending within a first side of the sole with respect to a longitudinal axis of the sole and the inner rib extending within a second side of the sole with respect to the longitudinal axis.

3. Ski boot sole according to claim 1, wherein the rear rib is in a substantially central position in a transverse direction of the sole that extends in a longitudinal direction.

4. Ski boot sole according to claim 3, wherein the rear rib extends over a length comprised in a range of from 30% to 60% of a length of a rear half of the sole defined between a middle of the sole and a rear end thereof.

5. Ski boot sole according to claim 1, wherein the reinforcing ribs of the plate comprise at least one selected from the group consisting of:
- the two front ribs and the rear rib are positioned within the plate and extend over a length comprised in a range of from 25% to 75% of a total length of the sole; and
- the two front ribs and the rear rib are positioned in a central zone of the sole and meet in a central zone of the sole.

6. Ski boot sole according to claim 1, wherein at least one selected from the group consisting of:
- the plate extends over at least 60% of a length of the sole, and
- the plate has a thickness comprised in a range of from 1.2 mm to 1.8 mm.

7. Ski boot sole according to claim 1, wherein the front component is U-shaped, the fixing device is configured for attaching at least one articulation bar, and two lateral portions are configured for accepting the gripping tread patterns.

8. Ski boot sole as claimed in claim 7, wherein at least one selected from the group consisting of:
- rear ends of the two lateral portions are positioned between 5 mm to 15 mm to a rear of a zone of greatest width of the sole, and
- rear ends of the gripping tread patterns of the two lateral portions are positioned between the zone of greatest width of the sole and 15 mm to the rear of the zone of greatest width of the sole.

9. Ski boot sole according to claim 7, wherein the two front ribs of the plate include an outer rib and an inner rib, and the two lateral portions are positioned in a continuation of the outer rib and of the inner rib of the plate.

10. Ski boot sole according to claim 1, wherein the plate made of composite material comprises a plastic matrix compatible with a material of at least one selected from the group consisting of the front and rear components, and wherein the at least one selected from the group consisting of the front and rear components are assembled with the plate by overinjection moulding.

11. Ski boot, which comprises a sole according to claim 1.

12. Ski boot sole according to claim 1, wherein the plate extends over at least 75% of a length of the sole.

13. Ski boot sole according to claim 1, wherein the gripping tread patterns are studs or lugs.

14. Ski boot sole according to claim 1, wherein the rear and front components are overinjection moulded on the plate.

15. Ski boot sole according to claim 1, wherein the two front ribs of the plate include an inner rib and an outer rib, the inner rib and the outer rib being arranged at lateral parts of the plate in an anterior half of the sole and forming a relief on an underside of the plate, wherein the inner rib does not join the outer rib, and a height of the inner rib decreases progressively until having substantially no height toward a center portion of the sole.

16. The ski boot sole according to claim 1, wherein a thickness of the reinforcing ribs is consistent with a thickness of the plate.

* * * * *